United States Patent Office 3,530,078
Patented Sept. 22, 1970

3,530,078
METHOD FOR THE PREPARATION OF POLYMERS OF TRIMETHYLSILOXY ALUMINUM DIHYDRIDE
Charles B. Roberts, Midland, and Darrell D. Toner, Sanford, Mich., assignors to The Dow Chemical Company, Midland, Mich., a corporation of Delaware
No Drawing. Filed July 24, 1967, Ser. No. 655,301
Int. Cl. C08g 31/36, 33/20
U.S. Cl. 260—2      2 Claims

ABSTRACT OF THE DISCLOSURE

This invention relates to a process for the preparation of inorganic polymers having the general formula:

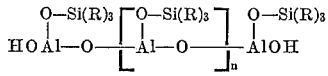

by contacting a substituted siloxyaluminum dihydride having the formula $H_2AlOSi(R)_3$ wherein R is an alkyl, aryl, aralkyl or cycloalkyl radical having up to 6 carbon atoms with water in an inert solvent at a temperature of from about 0° C. to about 30° C.

BACKGROUND OF THE INVENTION

Previous methods of making an inorganic polymer have employed reactions such as pyrolysis, hydrolysis or transesterification and such reactions have generally resulted in the formation of by-products such as water, alcohols, esters and the like. Additionally, these reactions are often difficult to control, frequently cause end capping of the product formed and thereby result in comparatively low molecular weight polymers and often produce problems of separation of the desired product from by-products.

SUMMARY OF THE INVENTION

This invention relates to a process for the production of inorganic polymers and more particularly relates to a process for the production of polymers of substituted siloxyaluminum dihydride whereby the only by-product is hydrogen.

It is an object of this invention to provide a process for the preparation of new inorganic polymers. A further object is to provide a novel process for the preparation of the homopolymers of substituted siloxyaluminum dihydride under mild conditions of temperature and pressure. These and other objects and advantages of the present process will become apparent from a reading of the following detailed description.

It has now been discovered that inorganic polymers having the formula:

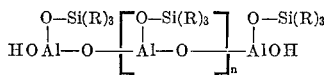

wherein R is an alkyl, aryl, aralkyl or cycloalkyl radical and n is a number up to about 20 prepared by the hydrolysis of trimethylsiloxy aluminum dihydride in an inert solvent such as ether or benzene containing sufficient water to produce such hydrolysis. The water hydrolyzes the substituted siloxyaluminum dihydride and causes polymerization thereof to form polymers having an Al—O—Al backbone or chain and hydrogen as the by-product. The polymerization reaction is thought to proceed according to the following general equation:

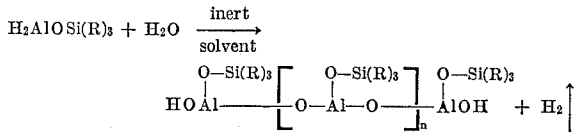

wherein R is an organic radical as defined below and n is the number of repeating units in the polymer.

Suitable substituted siloxyaluminum dihydride starting materials for use in the process of this invention are compounds having the formula:

wherein R is an alkyl, aryl, aralkyl or cycloalkyl group containing up to 6 carbon atoms. For example, the substituted siloxyaluminum dihydride starting materials for use in the process of this invention include

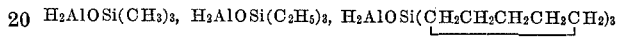

and the like. Such compounds are prepared according to the process disclosed in applicants' co-pending application Ser. No. 655,321, filed July 24, 1967, now U.S. Pat. No. 3,444,227.

Such substituted siloxyaluminum dihydride starting materials are first dissolved in a suitable solvent which is inert under the reaction conditions to the starting materials to water and to the polymer formed by the hydrolysis of such starting material. Solvents such as diethyl ether, tetrahydrofuran, benzene, toluene, dioxane and the like have been found particularly suitable as solvents herein. In general, the concentration of the substituted siloxyaluminum dihydride starting material in the solvent is between about 1 percent by weight and the maximum solubility therein at the temperatures employed. Solutions more dilute than this are generally undesirable in that they require larger equipment and involve more difficult and expensive solvent removal procedures.

Polymerization of the substituted siloxyaluminum dihydride in solution is accomplished by contacting such starting material with at least a stoichiometric quantity of water at a temperature of between about 0° C. and about 30° C. The water hydrolyzes and polymerizes the substituted siloxyaluminum dihydride by replacing the hydrogen from such hydride starting material, and therefore produces hydrogen as the only by-product of the process. The hydrogen thus formed passes from the solution leaving the polymer product dissolved in or admixed with the solvent. Since the reaction is not pressure sensitive, it is usually desirable to conduct the reaction at or near room temperature and atmospheric pressure.

In general, the molecular weight of the final product is controlled by the rate of contact between the water and the substituted siloxyaluminum dihydride, the concentration of the hydride in the solution and temperature of the reaction and polymerization. It is possible, therefore, to produce polymers ranging in molecular weight from that of a dimer to about 2000 and more. Upon completion of the hydrolysis and polymerization of the substituted siloxyaluminum dihydride, the polymer is recovered by removing the solvent therefrom by any suitable means such as by evaporation, distillation and the like. Once prepared, the polymers of this invention are found to be white solids which are soluble in the common solvents such as diethyl ether and benzene. Such polymers are film-forming and therefore find a particularly valuable utility as a film or coating to be applied to wood or metal substrates. Such films are generally soluble in the common organic solvents but, since they contain active hydrogens, they are capable of further reaction and modification of their characteristics by known methods. Additionally, the polymers of this invention find utility as a paint drier.

The following example is provided to further illustrate the invention but is not to be construed as limiting to the scope thereof.

EXAMPLE

To a diethyl ether solution containing 2 weight percent of trimethylsiloxyaluminum dihydride was added dropwise 450 milliliters of diethyl ether containing 0.17 percent water. After completion of the addition, the reaction mixture was stirred at room temperature and pressure for a period of 10 minutes. During this period hydrogen evolved from the reaction. At the end of this period the diethyl ether solvent and residual water were removed by vacuum distillation. The remaining material was a white solid which displayed film-forming properties and was found to be soluble in diethyl ether and benzene. Analysis showed the material to have a probable structure of

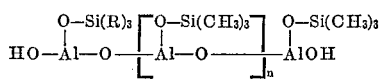

and a molecular weight of 2000.

Various modifications can be made in the present invention without departing from the spirit or scope thereof.

We claim:

1. A process for the preparation of inorganic polymers which comprises reacting trimethylsiloxy-aluminum dihydride in an inert solvent with water at a temperature of from about 0° C. to about 30° C.

2. The process of claim 1 wherein the temperature is about 25° C.

References Cited

UNITED STATES PATENTS 3,152,999  10/1964  Rust et al. _____ 260—2

OTHER REFERENCES

Dallas T. Hurd, "Chemistry of the Hydrides," John Wiley & Sons, Inc., pub. N.Y. 1952, p. 97.

SAMUEL H. BLECH, Primary Examiner

U.S. Cl. X.R.

117—132, 148, 161; 260—33.2; 33.6, 448